United States Patent
Bennett et al.

(10) Patent No.: US 9,703,003 B2
(45) Date of Patent: *Jul. 11, 2017

(54) METHODS FOR COMPOSITIONAL ANALYSIS OF DOWNHOLE FLUIDS USING DATA FROM NMR AND OTHER TOOLS

(71) Applicant: SCHLUMBERGER TECHNOLOGY CORPORATION, Sugar Land, TX (US)

(72) Inventors: Nicholas N. Bennett, Hamden, CT (US); Yi Zeng, Cambridge, MA (US); Lalitha Venkataramanan, Lexington, MA (US); Denise E. Freed, Newton Highlands, MA (US); Martin D. Hürlimann, Newton, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 734 days.

This patent is subject to a terminal disclaimer.

(21) Appl. No.: 14/109,354

(22) Filed: Dec. 17, 2013

(65) Prior Publication Data

US 2015/0168585 A1 Jun. 18, 2015

(51) Int. Cl.
*G01V 3/32* (2006.01)
*E21B 49/08* (2006.01)

(52) U.S. Cl.
CPC .............. *G01V 3/32* (2013.01); *E21B 49/082* (2013.01)

(58) Field of Classification Search
CPC .................................. G01V 3/32; E21B 49/08
See application file for complete search history.

(56) References Cited

U.S. PATENT DOCUMENTS 6,859,032 B2  2/2005  Heaton et al.
7,253,617 B1 *  8/2007  Chen ................... G01N 24/081
                                          324/300

(Continued)

FOREIGN PATENT DOCUMENTS

EP   1003053 A2   5/2000
WO   2008/048357 A2   4/2008
WO   2013/066953 A2   5/2013

OTHER PUBLICATIONS

International Search Report and Written Opinion for corresponding PCT Application Serial No. PCT/US2014/062917, dated Feb. 11, 2015, 15 pages.

(Continued)

*Primary Examiner* — G. M. Hyder

(57) ABSTRACT

Apparatus and methods of analyzing a composition of a hydrocarbon-containing fluid including using a nuclear magnetic resonance (NMR) tool to conduct a NMR relaxation measurement, a diffusion measurement, or both on the hydrocarbon-containing fluid to obtain NMR data, using a non-NMR tool to conduct an additional measurement of a reference fluid to obtain non-NMR data wherein the additional measurement comprises gas chromatography, optical observation, or both, and using the NMR data and the non-NMR data in an inversion process to determine an indication of the composition of the hydrocarbon-containing fluid. In some embodiments, the indication is determined over 4 chain length nodes.

38 Claims, 3 Drawing Sheets

(56) References Cited

U.S. PATENT DOCUMENTS

| | | | |
|---|---|---|---|
| 2004/0253743 A1* | 12/2004 | Freed | G01N 33/2823 436/173 |
| 2005/0242807 A1 | 11/2005 | Freedman | |
| 2008/0154509 A1 | 6/2008 | Heaton | |
| 2009/0289628 A1 | 11/2009 | Cao Minh | |
| 2010/0236326 A1 | 9/2010 | Freed | |
| 2013/0113480 A1 | 5/2013 | Kadayam Viswanathan et al. | |
| 2015/0168586 A1* | 6/2015 | Freed | G01V 3/32 324/303 |
| 2015/0168587 A1* | 6/2015 | Freed | G01V 3/32 324/303 |

OTHER PUBLICATIONS

Anand et al., "New Methods for Predicting Properties of Live of Live Oils from NMR," SPWLA 50th Annual Logging Symposium, Jun. 2009: pp. 1-15.

Badry et al., "Downhole Optical Analysis of Formation Fluids," Oilfield Review, Jan. 1994: pp. 21-28.

Epstein et al., "The Bad Truth about Laplace's Transform," SIAM Review, 2008, vol. 50(3): pp. 504-520.

Vankataramanan et al., "Applications of Mellin Transform in NMR," J. of Modeling, Design, and Simulation, Jun. 2010, vol. 1: pp. 46-54.

Anand, et al., "New Method for Predicting Properties of Live Oils from NMR", Petrophysics, vol. 53, No. 4, 2012, pp. 256-271.

International Search Report and Written Opinion issued in related PCT application PCT/US2014/066859 on Mar. 23, 2015, 11 pages.

Badry, et al., "Downhole Optical Analysis of Formation Fluids", Oilfield Review, vol. 6, Issue 1, Jan. 1994, pp. 21-28.

Cavalleri, et al., "Wireline Logging Including 2-Dimensional NMR and Downhole Spectroscopy Facilitates Accurate Identification of Pay and Composition of Formation Fluids in a Complex Reservoir", OMC-2013-178, Offshore Mediterranean Conference and Exhibition, Ravenna, Italy, Mar. 20-22, 2013, 9 pages.

Donaldson, et al., "Mean carbon number logging: hydrocarbon chain length determination using diffusion distributions at multiple depths", SPWLA 54th Annual Logging Symposium, Jun. 22, 2013, pp. 1-8.

International Search Report and Written Opinion issued in related PCT application PCT/US2014/062917 on Feb. 11, 2015, 15 pages.

Fordham, et al., "Imaging Multiexponential Relaxation in the (Y1 Loge T1) Plane, with Application to Clay Filtration in Rock Cores", Journal of Magnetic Resonance Series A, vol. 113, No. 2, Apr. 1995, pp. 139-150.

Freed, "Dependence on chain length of NMR relaxation times in mixtures of alkanes", Journal of Chemical Physics, vol. 126, No. 17, 2007, 10 pages.

Freed, et al., "One- and two-dimensional spin correlation of complex fluids and the relation to fluid composition", Comptes Rendus Physique, vol. 11, Issue 2, Mar. 2010, pp. 181-191.

Freed, et al., "Scaling Laws for Diffusion Coefficients in Mixtures of Alkanes", Physical Review Letters, vol. 9, No. 6, Feb. 17, 2005, 4 pages.

Morriss, et al., "Hydrocarbon Saturation and Viscosity Estimation From Nmr Logging in the Belridge Diatomite", The Log Analyst, vol. 38, Issue 2, 1997, pp. 44-59.

Fujisawa, et al., "Analyzing Reservoir Fluid Composition In-Situ in Real Time: Case Study in a Carbonate Reservoir", SPE 84092—SPE Annual Technical Conference and Exhibition, Denver, Colorado, Oct. 2003, pp. 1-9.

Fujisawa, et al., "Live Oil Sample Acquisition and Downhole Fluid Analysis", Asphaltenes, Heavy Oils, and Petroleomics, Chapter 22, Springer, New York, 2007, pp. 589-616.

Fujisawa, et al., "Near-Infrared Compositional Analysis of Gas and Condensate Reservoir Fluids at Elevated Pressures and Temperatures", Applied Spectroscopy, vol. 56, No. 12, 2002, pp. 1615-1620.

Godefroy, et al., "Discussion on Formation Fluid Density Measurements and Their Applications", SPE 114648—SPE Annual Technical Conference and Exhibition, Denver, Colorado, Sep. 21-24, 2008, 20 pages.

Hurlimann, et al., "Hydrocarbon Composition From NMR Diffusion and Relaxation Data", Petrophysics, vol. 50, No. 2, 2009, pp. 116-129.

Jestin, et al., "Application of NMR Solvent Relaxation and SAXS to Asphaltenes Solutions Characterization", Journal of Dispersion Science and Technology, vol. 25, No. 3, Jan. 2004, pp. 341-347.

Kleinberg, "NMR properties of reservoir fluids", The Log Analyst, vol. 37, No. 6, 1996, pp. 20-32.

Lo, et al., "Correlations of NMR Relaxation Time with Viscosity, Diffusivity, and Gas/Oil Ratios of Methane/Hydrocarbon Mixtures", SPE 63217—SPE Annual Technical Conference and Exhibition, Dallas, Texas, Oct. 1-4, 2000, 15 pages.

Mullins, et al., "Hydrocarbon Compositional Analysis In-Situ in Openhole Wireline Logging", SPWLA 45th Annual Logging Symposium, Jun. 6-9, 2004, pp. 1-14.

Mullins, et al., "The colloidal structure of crude oil and the structure of oil reservoirs", Energy & Fuels, vol. 21, 2007, pp. 2785-2794.

Mutina, et al., "Correlation of Transverse and Rotational Diffusion Coefficient: A Probe of Chemical Composition in Hydrocarbon Oils", Journal of Physical Chemistry A, vol. 112, No. 15, 2008, pp. 3291-3301.

Straley, "Reassessment of Correlations Between Viscosity and NMR Measurements", SPWLA 47th Annual Logging Symposium, Veracruz, Mexico, Jun. 4-7, 2006, 14 pages.

Van Steene, et al., "Fluid identification in light hydrocarbons using NMR and downhole fluid analysers", SPE North Africa Technical Conference and Exhibition, Feb. 14-17, 2012, pp. 1-13.

Hurlimann, et al., "Hydrocarbon Composition From NMR Diffusion and Relaxation Data", SPWLA 49th Annual Logging Symposium, Edinburgh, Scotland, May 25-28, 2008, 14 pages.

Venkataramanan, et al., "Mellin transform of CPMG data", Journal of Magnetic Resonance, vol. 206, No. 1, Sep. 2010, pp. 20-31.

Venkataramanan, et al., "Solving Fredholm Integrals of the First Kind With Tensor Product Structure in 2 and 2.5 Dimensions", IEEE Transactions on Signal Processing, vol. 5, No. 5, May 2002, pp. 1017-1026.

Zhang, et al., "Oil and Gas NMR Properties: The Light and Heavy Ends", SPWLA 43rd Annual Logging Symposium, Oiso, Japan, Jun. 2-5, 2000, 13 pages.

Zielinski, et al., "Probing Asphaltene Aggregation in Native Crude Oils with Low-Field NMR", Langmuir, vol. 26, No. 7, 2010, pp. 5014-5021.

Kleinberg, "Well Logging", Encyclopedia of NMR, Wiley, New York, 1996, 12 pages.

International Search Report and Written Opinion issued in related PCT application PCT/US2014/066845 on Mar. 23, 2015, 10 pages.

* cited by examiner

METHODS FOR COMPOSITIONAL ANALYSIS OF DOWNHOLE FLUIDS USING DATA FROM NMR AND OTHER TOOLS

CROSS REFERENCE TO RELATED APPLICATIONS

This application is related to U.S. patent application Ser. Nos. 14/109447 and 14/109497, both entitled "Methods for Compositional Analysis of Downhole Fluids Using Data from NMR and Other Tools" and filed on Dec. 17, 2013, which are hereby incorporated by reference in their entirety herein.

FIELD

This generally relates to hydrocarbon-bearing geological formations. More particularly, the subject disclosure relates to methods for analyzing the compositional analysis of formation fluids using nuclear magnetic resonance (NMR) and additional data from a variety of samples using other tools including gas chromatography, optical observation, or both.

BACKGROUND

Optical (spectral) data from downhole fluid analysis logging tools are currently used to determine the composition of crude oils downhole. For some tools, the amount of water and carbon-dioxide ($CO_2$) can also be determined. In addition, the optical density can be used to obtain information about asphaltenes and resins.

NMR relaxation and diffusion data can also be used to determine oil composition. From this data, the average carbon chain length and the chain length concentration distribution can be obtained. In addition, the comparison of transverse and longitudinal relaxation times and/or diffusion can give some information about asphaltenes. The shapes of the distributions can be a signal of highly biodegraded oils. Furthermore, the measurement of the NMR relaxation dispersion, i.e., the relaxation profile as a function of the applied magnetic field, can yield additional information about the aggregation propensity of the asphaltenes and resins in the crude oil.

NMR relaxation and diffusion measurements can be made with a downhole fluid analysis logging tool. A combination of factors including tool measurements and the harsh subterranean environment introduce some uncertainty into the calculated relaxation and diffusion distributions. Once the relaxation or diffusion distributions are known, the NMR data can be used to obtain information about chain length distributions and the viscosity of the oil. Several methods have been proposed to relate NMR relaxation and diffusion to chain length distributions. One method makes use of radial basis functions to interpolate between known data and new measurements. Another method uses the constituent viscosity model to relate the diffusion coefficients and relaxation times of each component to its microscopic, or constituent, viscosity. An additional method is based on looking at mixtures of alkanes, but can apply to oils with other components also. Herein, we abbreviate the carbon chain including the carbon length concentration distribution using Cx to indicate a carbon chain of x linear molecules. Carbon chains with components that included carbon branches and/or carbon-carbon double bonds were assumed to have a negligible influence on the final results.

Scaling Law and Fluid Composition Estimation

Previous work estimating fluid composition in terms of component weight fractions has been based on establishing a relationship between component T2 relaxation time and hydrocarbon mixture component chain length. Equation (1) from states that $T_{2,j}$, the $T_2$ relaxation time for a hydrocarbon mixture component with chain length j, varies as a monomial function of component chain length $N_j=j$ and of harmonic mean chain length $\bar{N}=\Sigma_j^{f(N)}{}_j/N_j$ where $f(N_j)$ represents the mixture component molar fraction. The constants B, $\kappa$, and $\gamma$ vary with temperature and pressure.

$$T_{2,j} = B N_j^{-\kappa} \bar{N}^{-\gamma} \quad (1)$$

The scaling law (1) has been derived for mixtures of alkanes based on theoretical arguments and limited experimental data of samples. Measurements on dead black oils indicated that this scaling law is also useful for the analysis of crude oils, as long as there is not a lot of asphaltenes present.

Because component T2 relaxation time is a monomial function of chain length in Equation (1), a direct estimate of mean chain length, $\bar{N}$, can be computed as a moment of the NMR measurements according to Equation (2).

$$\bar{N} = [B^{-1/\kappa} \langle T_2^{1/\kappa} \rangle]^{\frac{-\kappa}{\gamma+\kappa}} \quad (2)$$

Here, terms of the form $\langle T_2^{\alpha} \rangle$ are moments of the $T_2$ distribution that can be computed directly from the NMR measurements using a Mellin transform.

Further, one observes that if T2 relaxation time were a monomial function of chain length $N_j=j$, then an estimate of fluid viscosity can be made using moments of the T2 distribution as shown in Equation (3).

$$\eta \propto \bar{N}^{\beta} \langle N^{\nu} \rangle = [\langle T_2^{1/\kappa} \rangle]^{\frac{-\beta\kappa-\gamma\nu}{\gamma+\kappa}} \langle T_2^{-\nu/\kappa} \rangle \quad (3)$$

Estimation of T2 relaxation times from CPMG and GC measurement database

We compiled a database of NMR relaxation (CPMG and T1 T2) and gas chromatography (GC) measurements for oil samples of varying fluid composition taken at a variety of temperatures and pressures. Our initial model for relating CPMG measurements, $M(i\Delta t)$, to fluid composition in terms of component proton fractions, $p_j$, and component T2 relaxation times, $T_{2,j}$, is Equation (4).

$$M(i\Delta t) = \sum_i p_j^{GC} \exp(-i\Delta t/T_{2,j}) \quad (4)$$

Note that proton fractions $p_j^{GC}$ can be converted to and from weight fractions by first converting to molar fractions.

Because both GC measurements and NMR measurements are available for each of these crude oil samples in the database, the behavior of component relaxation times $T_2$ as a function of component chain length j can be studied by solving Equation (4) for the component relaxation times $T_{2,j}$. This non-linear inversion involved making the assumption that (a) we extended the C30+ component of the GC to C30-C60 using a log-linear extension; (b) we assumed a non-increasing behavior of relaxation time $T_2$ as a function of chain length j.

The relaxation times predicted by the scaling law in Equation (1) differ strongly from those predicted using Equation (4). It should be noted that Equation (1) was estimated using a database of oils whose compositions, temperatures, and pressures were much more restricted than those used to invert Equation (4). Further, when a crude oil contains more than about 2 percent of asphaltenes, it was found that Equation (1) systematically overestimates the relaxation times for all components. This is caused by the interaction between the oil molecules and asphaltene that is not considered in Equation (1). In the case of live oils, another limitation is encountered: small molecules such as methane and ethane are not only relaxed by dipolar interaction, but also by the mechanism of spin rotation that is not included in the derivation of Equation (1). For these reasons, Equation (1) also overestimates the relaxation times for molecules of small chain lengths.

Additional analysis using GC and NMR using Carr, Purcell, Meiboom and Gill sequences (CPMG) measurements shows the trend of the relaxation times predicted by Equation (4) roughly follow a log-linear trend and differ strongly from those predicted by the scaling law in Equation (1). Further, the T2 relaxation times estimated using Equation (4) show a dependence on pressure that agrees with our basic NMR physics understanding.

Additional lab data shows the dependence of the T2 relaxation times predicted via Equation (4) for six different oils at a fixed temperature and pressure. The approximate log-linear trends remain in evidence. The dependence on the oil samples, as we shall see, can be shown to be related to arithmetic mean chain length of the oil sample.

We note here that the limitations posed by Equation 1 for the estimation of fluid composition can be overcome by collecting additional diffusion data. Diffusion is intrinsically a more direct probe of the molecular size than relaxation, but is more time consuming to measure. Diffusion measurements allow a much better characterization of the lower chain length compositions, including methane. In addition, a comparison of T1 and T2 measurements allow the detection of asphaltenes. That approach is based on the analysis of NMR relaxation and diffusion measurements using an interpolation scheme within a large data base. A method to resolve these shortcomings is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments herein relate to apparatus and methods of analyzing a composition of a hydrocarbon-containing fluid by using a nuclear magnetic resonance (NMR) tool to conduct a NMR relaxation measurement, a diffusion measurement, or both on the hydrocarbon-containing fluid to obtain NMR data, using a non-NMR tool to conduct an additional measurement of a reference fluid to obtain non-NMR data wherein the additional measurement comprises gas chromatography, optical observation, or both, and using the NMR data and the non-NMR data in an inversion process to determine an indication of the composition of the hydrocarbon-containing fluid. In some embodiments, the indication is determined over 4 chain length nodes.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein.

DETAILED DESCRIPTION

The particulars shown herein relate to embodiments of the invention for purposes of illustrative discussion of the subject disclosure and are presented to provide what is believed to be the most useful and readily understood description of the principles and conceptual aspects. In this regard, no attempt is made to show structural details in more detail than is needed for the fundamental understanding of the subject disclosure, the description taken with the drawings making apparent to those skilled in the art how the several forms of the subject disclosure may be embodied in practice.

Figure 1:
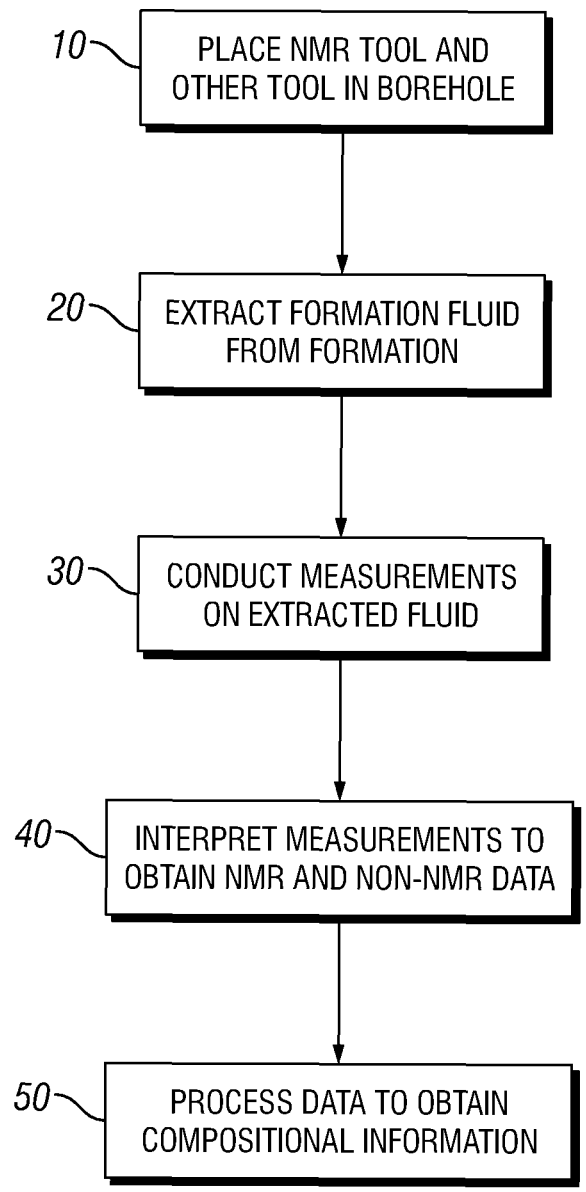
FIG. 1 is a flow chart of a disclosed method.

Turning to FIG. 1, a broad method is disclosed. At 10, one or more downhole fluid analysis logging tools used to extract fluid from a formation and to take measurements on these fluids are placed downhole. At 20, the one or more tools are used to extract fluid from a formation, and at 30, measurements (experiments) on the fluid are conducted. These measurements include NMR measurements, such as relaxation measurements or diffusion measurements, and at least additional non-NMR measurements such as optical measurements, mass density measurements, viscosity measurements, or a combination thereof. These different measurements can be made by the same logging tool or different logging tools. Even if a single tool can make both NMR and non-NMR measurements, that tool will be considered as comprising multiple tools because it has multiple functions. In some embodiments, the fluid and/or tools may remain in the wellbore for the entire method and in some embodiments, the fluid and/or tools may be removed in the midst of the method. At 40, one or more processors located downhole and/or uphole are used to interpret this raw data to obtain quantities such as the NMR magnetization decays, the distributions of NMR relaxation times and diffusion coefficients, optical spectra and densities, and the density and viscosity of the fluid. At 50, the processor then uses the NMR determinations and the other determinations, such as optical spectra determinations, together in order to obtain compositional information including an indication of composition, such as a chain length distribution, mean chain length, weight percent of a component, weight percent of a pseudocomponent (e.g., a combination of components), mole percent of a component, mole percent of a pseudo-component, gas-to-oil ratio, viscosity, or a combination thereof.

The NMR tool can measure, but is not restricted to a measurement of, NMR diffusion, NMR longitudinal relaxation ($T_1$) NMR transverse relaxation ($T_2$), the dispersion of NMR relaxation, NMR hydrogen index, and high resolution NMR spectroscopy data. The non-NMR tool can measure, but is not restricted to a measurement of, optical density, optical spectra, fluid density, viscosity, temperature, and pressure. In one aspect, as described below, additional information may be obtained, such as the amount of dissolved gases, such as $CO_2$, information about asphaltenes and biodegradation, and the viscosity of the oil in addition to conducting an enhanced compositional analysis.

In some embodiments, it is assumed that a forward model exists that allows for the prediction of the distribution of relaxation times or diffusion coefficients from the composition of the fluid. One example is the constituent viscosity model in U.S. Pat. No. 6,859,032, which is incorporated by reference herein, and another is the previously-described alkane mixture model. A third example is the empirical interpolation scheme described in Anand, V., and Freedman, R., "New methods for predicting properties of live oils from NMR," *Paper AAAA Proceedings of the* 2009 *Annual SPWLA Symposium* (2009), which is incorporated by reference herein. These models can be extended to treat dissolved gases such as carbon dioxide and methane.

In various embodiments, the resolution and width of the carbon chain length distribution can be enhanced by combining data from different tools. For example, the optics data is sensitive to small alkanes such as $C_1$ (methane) and $C_2$ (ethane), but it lumps the composition for hexane and larger alkanes into one pseudo-component, $C_{6+}$ such that the individual weight percents of molecules with carbon number 6 and greater are not determined. The NMR data can give the composition over the entire range of carbon numbers, but the resolution and accuracy is, in many cases not as fine as the optics data is for the small carbon numbers such as $C_2$ through $C_5$. As described in more detail below, by using the optical data to constrain an inversion process that inverts the NMR data, or by combining the two sets of data in other ways, a chain length distribution that has greater resolution and accuracy at low carbon numbers and also covers a wider range of chain length is achieved.

In other embodiments, data from NMR is combined with data from other tools to enable a determination of the oil composition when the NMR data by itself is insufficient for obtaining chain length distributions. An example of this is when there are dissolved gases such as methane and ethane in the oil. These gases relax by different processes than the rest of the oil. In order to obtain chain length distributions from the relaxation data, it is useful to know the amount of methane and ethane in the oil. By combining the optics data and density data with the NMR relaxation data, it becomes possible to obtain a more robust, full chain-length distribution.

In further embodiments, data from other tools are combined with the NMR raw data to improve the inversion of the raw data and thereby improve the accuracy of the chain length distribution derived from the NMR data. In particular, obtaining NMR relaxation and diffusion distributions from the magnetization decay involves an inversion process, such as an inverse Laplace transform. There are many solutions for the distributions that are consistent with the raw data within the tolerance of the noise level. Constraining the solution for the diffusion or relaxation distributions to be consistent with oil properties, such as composition or viscosity derived from other tools, restricts the distributions to ones that better reflect these physical properties of the oil. This, in turn, provides better values for the chain length distributions. In addition, the raw data from the NMR tools can be inverted directly to chain length distributions, and, again, by constraining the distributions to agree with measurements from other tools, the accuracy of the chain length distributions can be improved.

In one embodiment, the chain length distribution from NMR is combined with the composition from an optics tool to enhance the resolution and range of the final chain length distribution. More particularly, optical data from downhole optical tools provides weight fractions for a few components below $C_6$ and lumps the additional weight fractions as $C_{6+}$. Essentially, that means that the optical tool provides no detailed information above $C_5$. Similarly but conversely, while NMR measurements provide information over a full chain length range, the resolution in the chain length distribution found by direct methods, in many cases, is quite poor between $C_1$ and $C_6$. By combining the different measurements, chain length distributions over a wide range of chain lengths can be obtained with a higher resolution than from either alone.

Information about the composition of the fluid (e.g., chain length distribution) can be normalized using the non-NMR data. The chain length distribution determined from the NMR data is normalized by rescaling the chain length distribution to make the distribution consistent with the non-NMR data. For example, suppose the weight percents $w_{c1}$, $w_{c2-c5}$ and $w_{c6+}$ have been determined from processing associated with an optical tool, and the chain length distribution $\{N_i, w_i\}$ has been determined from processing associated with an NMR tool. The optics data can be delumped according to known techniques to obtain $w_{c1}$, $w_{c2}$, $w_{c3}$, $w_{c4}$, $w_{c5}$ and $w_{c6+}$. For the new distribution, $W(N_i)$ the values of $w_{ci}$ found from the optics can be kept for carbon numbers less than 6. The $w_{c6+}$ fraction can then be used to normalize the components $w_i$ for carbon numbers i≥6 from the NMR distribution, to obtain the entire distribution. The new distribution then becomes $$W(N_i) = \begin{cases} w_{ci} & \text{for } i \leq 5 \\ w_i \dfrac{w_{c6+}}{\sum_{j \geq 6} w_j} & \text{for } i \geq 6 \end{cases} \quad (5)$$

Figure 2:
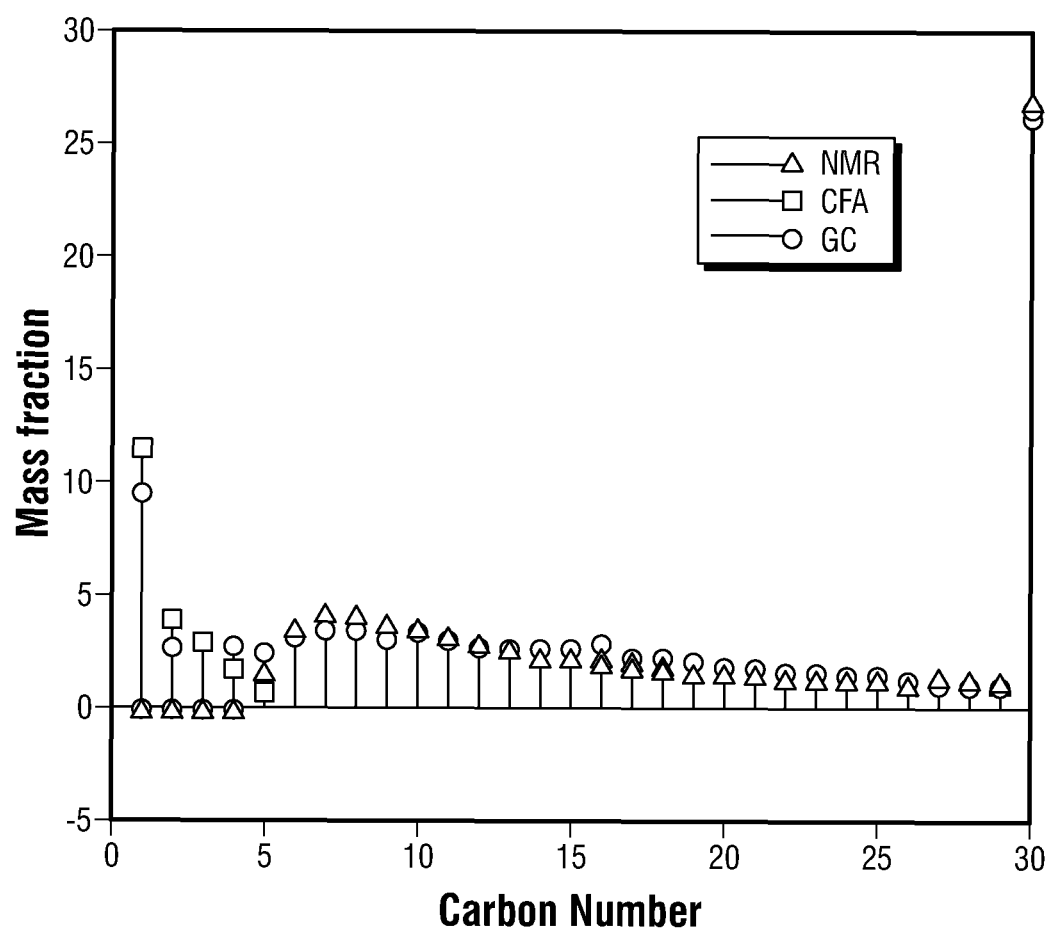
FIG. 2 are plots of the chain length distribution of an oil sample obtained from an optical tool, an NMR tool as weighted according to one embodiment, and gas chromatography.

An example is given in FIG. 2. In this case, the NMR data was taken on the dead oil (with no dissolved gases), so the NMR distribution (triangles) contains no information (i.e., the mass fraction is set to zero) for $C_1$ through $C_4$ and normalized information (based on equation (5)) for carbon chains 5 and larger. The processed (delumped) optics data on the live oil (squares) shows the weight percent up to $C_5$. The combined distribution is given by the squares for $C_1$ through $C_5$ and by the triangles for $C_6$ and above. If desired, the optics and NMR results can be averaged or weighted for $C_5$ as discussed in more detail hereinafter. The combined distribution takes into account the full range of carbon numbers measured by gas chromatography (circles) on the live oil, and, as seen in FIG. 2, agrees quite well with the gas chromatography.

In some cases, the data from NMR for some of the shorter chains may also be reliable. Then this information can also be included in the final chain length distribution. For example, if the amount of methane from NMR, $w_1$, is considered to be fairly reliable, then the final chain length distribution can be taken to be $$W(N_i) = \begin{cases} aw_{c1} + (1-a)w_1 & \text{for } i \le 5 \\ w_i \dfrac{1 - \sum_{i=1}^{5} W(N_i)}{\sum_{j \ge 6} w_j} & \text{for } i \ge 6 \end{cases} \quad (6)$$

where a is a measure of the confidence level of the optically determined $w_{c1}$ versus the NMR-determined $w_1$.

Another embodiment involves combining NMR data and data from other tools, such as optical tools, density tools, pressure tools, or viscometers, and inverting the combined data to obtain chain length distributions. The NMR data may include NMR relaxation, NMR diffusion distributions, or hydrogen index measurements. The additional data from the other tools can make it possible to obtain chain length distributions from the NMR data in cases where the inversion of the NMR data would otherwise be non-unique or the NMR data by itself is insufficient to determine the chain length distribution. It also augments the range of chain lengths that can be resolved by optics alone.

The equations set forth above for the mean chain lengths and the chain lengths in terms of the diffusion or relaxation distributions also depend on pressure and temperature. Thus, to obtain the mean chain lengths and the chain length distributions from NMR measurements, it is useful to combine these measurements with pressure and temperature measurements.

Oils often contain dissolved gases such as methane and ethane. These gases relax via different processes than the larger alkane molecules. As a consequence, they can have the same relaxation time as larger molecules, such as hexane. This makes the inversion process for the chain length distribution from relaxation distributions non-unique, unless additional information, such as the amount of methane, is known. Often, though, the relaxation measurements are taken with considerably more resolution than the diffusion measurements. This means that, in principle, they should give much higher quality chain length distributions, if the issues of the dissolved gases can be resolved, and if there is little to no asphaltene in the oil. In some cases, diffusion measurements are not made. Thus, it is useful to have a method for calculating the chain length distribution from relaxation times.

Additionally, dissolved carbon dioxide ($CO_2$) changes the density and free volume of the oil and influences the diffusion coefficients and relaxation times of the oil. However, the $CO_2$ is not directly observed by downhole NMR tools. As a result, if there is a substantial amount of $CO_2$ in the oil, just applying equations (2) through (6) will not give an accurate chain length distribution. To properly account for the effects of $CO_2$, it is useful to have an independent measure of $CO_2$.

What follows is a detailed example for determining the chain length distribution from the relaxation time distribution when there is a substantial amount of methane in the oil. Other hydrocarbon gases such as ethane can be treated similarly. For dissolved methane, spin rotation and intermolecular relaxation are the dominant contribution to its relaxation. This is in contrast to most other alkanes, where intramolecular relaxation is the dominant mode of relaxation.

In other embodiments, the raw data from NMR can be combined with data from one or more of optics, density, viscosity, and pressure downhole measurement tools to improve the inversion process for the physical properties from the NMR data. One example of this is using results from tools, such as optics or the viscometer, to constrain the inversions for $T_1$, $T_2$, or diffusion to obtain distributions that are consistent with this other data. More particularly, NMR distributions are obtained using an inverse Laplace transform of the magnetization decay. However, this inverse Laplace transform is ill-conditioned, which means that when the signal has noise, there are many solutions which fit the data. In many cases, some constraint, such as smoothness of the distribution, is imposed to restrict the solution to more physical ones.

In other embodiments, the raw data from a downhole NMR tool is combined with data from other downhole tools to invert directly for information about the composition.

Optical data can also be combined with NMR relaxation measurements to determine fluid composition. For example, a log-linear scaling law can be used to relate component T2 relaxation time to component chain length. The scaling law can be used to obtain fluid mixture component weight fractions from the NMR relaxation measurements. Moreover, optical data can be used with the NMR measurements and the scaling law to obtain further refined estimates for these component weight fractions.

Herein, in at least one embodiment, we follow an approach that combines practical information from a sample library and a modified scaling law method. Initially, we are analyzing a large data set of NMR and GC data and extract a phenomenological scaling law that is consistent with both sets of data. Since the relaxation data is intrinsically not very sensitive to the small molecules, we then complement the NMR relaxation data with optics data.

One source of data for the sample library is a collection of samples at the Schlumberger Donald B. Robinson Technology Center of Edmonton, Canada. The samples were selected based on the variety of behaviors they exhibit over a pressure range of 5000-25000 psi and temperature range of 75-175° C. Additional parameters are provided in more detail in Table 1 below. The samples were collected from Schlumberger locations in North Sea, Canada, United States including the lower 48 states and Alaska, Gulf of Mexico, Middle East, and Africa. The selected samples were live oil samples that contained dissolved gases. In addition, the measurements were obtained at a broad range of temperatures and pressures so their properties would be representative of oil samples that would be obtained downhole during reservoir sampling operations. The methods we describe model the NMR relaxation times of the sample components as being a log linear function of chain length and then use this relation to invert NMR relaxation measurements for fluid composition. Having a collection of live oil samples is critical, so we can model the NMR relaxation times for short chain lengths. Similarly, having a collection of measurements obtained at a broad range of temperatures and pressures is critical, so our modeling relations are accurate for samples obtained downhole during logging operations.

Optical measurements were first obtained using a Cary spectrometer with a 1 nanometer resolution that was placed in the same high temperature and pressure environment as the NMR measurement apparatus. The 10-20 optical measurements typically obtained downhole during logging operations and also used for the analysis were then obtained from the continuous optical spectrum using a filtering operation in the optical transmission domain. Alternatively, we could have used the actual downhole optical measurement device instead of the Cary spectrometer. All optical measurements were obtained at the same broad range of temperatures and pressures wherein the NMR measurements were obtained. This allowed us to properly model the influences of both temperature and pressure on our modeling results.

TABLE 1

Properties of the samples in the DBR database.

| Property | MIN | MAX |
|---|---|---|
| Sample Temperature | 75° C. | 175° C. |
| Sample Pressure | 5000 psi | 25000 psi |
| GOR | 159 SCF/bbl | 3003 SCF/bbl |
| OD @ 1725 nm, 15 Kpsi, 125 C. | 0.5835 | 0.7870 |
| T1/T2 ratio | 1.0 | 1.66 |
| C1 wt % | 1.3 | 17.56 |
| C30+ wt % | 7.7 | 38.04 |
| Min T2 PDF support (seconds) | 0.0039 | 0.0773 |
| Max T2 PDF support (seconds) | 0.8913 | 23.2304 |

Modeling the T2 Relaxation times estimated from GC and CPMG measurements

We model the T2 relaxation times as a piecewise log-linear function of chain length with nodes at C1, C2, C45, and C60, denoted by $T_2(j; T_{2,C1}, T_{2,C2}, T_{2,C45}, T_{2,C60})$. Four nodes were needed to allow enough degrees of freedom to adequately model the NMR relaxation times as a function of chain length. An individual node was used for C1, as C1's relaxation time was largely independent of the relaxation times of the other components, particularly at high temperatures. Nodes were placed at C2 and C45 as the trend in the NMR relaxation times was most consistently log linear in this region. Finally, a node was placed at C60 to model the tail of the distribution of NMR relaxation times whose behavior did not always follow the log-linear trend between C2 and C45. The initial selection of the four nodes was initially based on visual plots of NMR relaxation times as a function of chain length. We later found that using additional nodes to model relaxation times led to fluid composition results which were underdetermined. The node selections do correspond to our physical intuition about the behavior of crude oil mixtures at a broad range of reservoir temperatures and pressures.

Thus, a four parameter piecewise log-linear function describes T2 relaxation times as a function of mixture component chain length. The T2 relaxation times at the nodes are computed from the CPMG and GC measurements by inverting Equations (7) and (8).

To establish the four parameter values of this scaling law as functions of temperature, pressure, and mean chain length, we began by estimating the T2 relaxation times $T_{2,C1}$, $T_{2,C2}$, $T_{2,C45}$, $T_{2,C60}$ for each fluid sample from its GC and CPMG measurements by solving Equation (7).

$$M(i\Delta t) = \sum_j p_j^{GC} \exp(-i\Delta t/T_2(j; T_{2,C1}, T_{2,C2}, T_{2,C45}, T_{2,C60})) \quad (7)$$

In performing this estimation, we again placed constraints on the T2 relaxation times at the four nodes $T_{2,C1}$, $T_{2,C2}$, $T_{2,C45}$, $T_{2,C60}$ using various formulations of the forward model used to map the four parameters to the T2 relaxation times as a function of chain length j. For example, the MATLAB function shown in Equation (8) parameterizes T2 relaxation times as a decreasing function of chain length. The function's inputs are $T_{2,C1}-T_{2,C2}$, $T_{2,C2}-T_{2,C45}$, $T_{2,C45}-T_{2,C60}$, and $T_{2,C60}$, so that the inversion used to solve Equation (7) can have a simple positivity constraint on the parameter values used for the inversion.

```
function X=T2_segment_monoton(x,position,length)

y=x;

x(4)=y(4);

x(3)=sum(y(3:4));

x(2)=sum(y(2:4));

x(1)=sum(y(1:4));

X(position:length)=log space(log 10(x(3)),log 10(x(4)),length−position+1);

X(2:position)=log space(log 10(x(2)),log 10(x(3)), position−1);

X(1)=x(1);

end                                                                (8)
```

The $T_{2,C1}$, $T_{2,C2}$, $T_{2,C45}$, $T_{2,C60}$ node values for our piece-wise log linear scaling law that were estimated from the GC and CPMG measurements by inverting Equations (7) and (8) for each fluid sample were plotted including data from samples at 175° C., 125° C., and 75° C. The estimated log 10 T2 relaxation times at the C1, C2, C45, and C60 nodes are very well approximated as quadratic functions of the baseline parameter (mean chain length/temperature)*pressure$^{0.1}$. Indeed, the R-values for these approximations using a quadratic function are typically higher than 0.8, except for the $C_{60}$ node where there is more scattering of values. Note that this estimation procedure did not include samples from oil samples 1 and 9 as described below; the parameter values computed for these samples appeared as strong outliers in this estimation exercise.

Equation (9) constitutes our four parameter piecewise log-linear scaling law as functions of temperature, pressure, and arithmetic mean chain length.

$X$=(Mean Chain Length/Temperature)*Pressure$^{0.1}$ $T_{2,C1}(X)=\exp(-303.12X^2+0.73X+2.76)$ $T_{2,C2}(X)=\exp(-630.29X^2+51.70X+0.87)$ $T_{2,C45}(X,T)=\exp(-994.9X^2+106.24X-6.151+T/160)$ $T_{2,C60}(X,T)=\exp(-1915.5X^2+276.19X-15.58+T/160)$ \quad (9)

We can validate the scaling law given in Equation (9) by assessing how well it predicts the CPMG data from the GC measurements using Equation (7). That is, using the GC measurements we can (a) compute the sample proton fractions $p_j^{GC}$ a function of chain length j; (b) compute the arithmetic mean chain length M from the sample proton fractions $p_j^{GC}$; (c) use the sample temperature, pressure, and mean chain length to compute the node values $T_{2,C1}$, $T_{2,C2}$, $T_{2,C45}$, $T_{2,C60}$ for the four parameter scaling law described in Equation (9); and finally, (d) use Equation (7) to forward model the CPMG measurements. The results of this forward modeling exercise were plotted. We observed good qualitative agreement for the majority of the samples.

Estimating Weight Fractions from CPMG data using the four Parameter Scaling Law

Using the CPMG data, temperature, and pressure for a particular crude oil sample, we estimated the fluid composition as mixture component weight fractions as a function of chain length. We used the scaling law to compute the mixture component T2 relaxation times as a function of chain length j, $T_2(j; T_{2C1}, T_{2,C2}, T_{2,C45}, T_{2,C60})$, and then to solve the associated linear system shown in Equation (10) for the corresponding weight fractions.

Because the scaling law in Equation (9) requires an estimate of arithmetic mean chain length, Algorithm I uses mean chain length as a fitting parameter, recomputed at each iteration using the current estimate for component proton fractions. This approach is done instead of using a mean chain length estimator like that in Equation (2).

Algorithm I: Estimate Weight Fractions from Scaling Law and CPMG Data
 1) Initial Guess for Mean Chain Length, $M_{current}$=20.
 2) Use the sample temperature, pressure, and $M_{current}$ in Equation (9) to compute T2 relaxation times at the four nodes $T_{2,C1}$, $T_{2,C2}$, $T_{2,C45}$, and $T_{2,C60}$.
 3) Estimate component proton fractions by solving linear system given by $$M(i\Delta t) = \sum_{j=1}^{60} p_j \exp(-i\Delta t / T_2(j; T_{2,C1}, T_{2,C2}, T_{2,C45}, T_{2,C60})) \quad (10)$$

Here $T_2(j; T_{2,C1}, T_{2,C2}, T_{2,C45}, T_{2,C60})$ is value of the log linear interpolation between the T2 relaxation times for C1, C2, C45 and C60.
 4) Update current mean chain length estimate, $M_{current}$ using the inverted proton fractions $p_j$ using the average of previous mean chain length estimates
 5) Repeat steps (2)-(4) until mean chain length estimate converges.

We plotted the processing results obtained from applying Algorithm I to the CPMG measurements for the oil 10 samples at three different temperatures and a fixed pressure. We observed that the weight fraction estimates from Algorithm I are not in good agreement with the GC. We made three additional observations. First, the CPMG and the forward modeling result from the GC and scaling law are in qualitative agreement. Second, the T2 relaxation times derived from GC and CPMG seems also to be in relatively close agreement with those estimated using the scaling law in Algorithm I. Finally, we note that the T2 PDF estimated from the CPMG measurements and the T2 PDF computed from the Algorithm I solution (see Equation (11)) are in close agreement.

$$M(i\Delta t) = \sum_{j=1}^{60} p_j^{AlgI} \exp(-i\Delta t / T_2(j; T_{2,C1}^{AlgI}, T_{2,C2}^{AlgI}, T_{2,C45}^{AlgI}, T_{2,C60}^{AlgI})) \quad (11)$$

The results indicate that the inverse problem of estimating weight fractions from CPMG measurements is quite sensitive to the choice of T2 relaxation times $T_{2,j}$. This is because the linear system being solved in Step 3 of Algorithm I is closely related to the Inverse Laplace Transform which has many solutions.

Estimating Weight Fractions from CPMG and Optics data using the four Parameter Scaling Law Optics measurements made on fluid samples can be used to estimate fluid composition for mixture components with relatively short chain lengths, i.e., from methane (C1) through pentane (C5). To help refine the arithmetic mean chain length estimates made by Algorithm I and thus reduce the set of possible solutions to the inverse problem in Equation (10), Algorithm II introduces the weight fraction constraints from the optics measurements into Step (4) of Algorithm I.

Algorithm II: Estimate Weight Fractions from Scaling Law and CPMG and Optics Data
 1) Initial Guess for Mean Chain Length, $M_{current}$=20
 2) Use the sample temperature, pressure, and $M_{current}$ in Equation (9) to compute T2 relaxation times at the four nodes $T_{2,C1}$, $T_{2,C2}$, $T_{2,C45}$, and $T_{2,C60}$.
 3) Estimate component proton fractions by solving linear system given by $$M(i\Delta t) = \sum_{j=1}^{60} p_j \exp(-i\Delta t / T_2(j; T_{2,C1}, T_{2,C2}, T_{2,C45}, T_{2,C60})) \quad (12)$$

Here $T_2(j; T_{2,C1}, T_{2,C2}, T_{2,C45}, T_{2,C60})$ is value of the log linear interpolation between the T2 relaxation times for C1, C2, C45 and C60.
 4) Replace the first five estimated values for proton fractions $p_j$ with the corresponding estimates for proton fractions obtained from optics. Renormalize the proton fractions $p_j$ for j=6, ... 60 so that the sum of all proton fractions is 100%. Update current mean chain length estimate, $M_{current}$ using the modified set of proton fractions.
 5) Repeat steps (2)-(5) until mean chain length estimate converges.

Alternately, one can introduce the weight fraction estimates from optics directly into the linear system as in Equation (13). Algorithm II does not introduce the constraints from optics into the linear system in Equation (12), because we found that when there is a significant lack of consistency between the weight fraction estimates from GC and from optics, the linear system is relatively unstable. Algorithm II uses the constraints from optics in this embodiment only to improve upon the internal estimate for mean chain length.

$$\begin{bmatrix} p_1^{optics} \\ p_2^{optics} \\ \vdots \\ p_5^{optics} \\ M(i\Delta t) \end{bmatrix} = \begin{bmatrix} I_{5x5} & 0_{5x60} \\ \exp(-i\Delta t/T_{2,j}) \end{bmatrix} \begin{bmatrix} p_1 \\ p_2 \\ \vdots \\ p_{60} \end{bmatrix} \quad (13)$$

The results of the Algorithm II processing for oil 10 using the CPMG and optics measurements were plotted. We observe (a) a much closer agreement between the T2 relaxation times predicted from GC and CPMG and the T2 relaxation times obtained from the scaling law and the final Algorithm II mean chain length estimate; and (b) a much closer agreement between the weight fraction estimates and the GC measurements. The observed inconsistency between the GC and weight fraction estimates for C1-C5 arises from the corresponding inconsistency between the optics and GC measurements.

Algorithm II is not sufficient to estimate fluid composition for all oil samples in terms of component weight fractions from NMR and optics. The Algorithm II processing results for oil 4 were also plotted. The T2 relaxation times are consistent with the raw CPMG measurements. We note also that the T2 relaxation times predicted by Algorithm II differ somewhat from the T2 relaxation times estimated from GC and CPMG measurements. To improve the weight fraction estimation results for oil 4, there is a need to modify the T2 relaxation times being used for proton estimation. Algorithm III uses the optics measurements to perform this modification.

Estimating Weight Fractions from CPMG and Optics Data with 4 Parameter Scaling Law, II To improve upon the results obtained by Algorithm II, we use the five proton fractions estimated from the fluid sample's optic measurements, $(p_1^{optics}, p_2^{optics}, \ldots, p_5^{optics})$ to optimize the selection of the four T2 relaxation times, $T_{2,C1}$, $T_{2,C2}$, $T_{2,C45}$, $T_{2,C60}$, that determine the piecewise log-linear scaling law. We first define a function that returns the first five proton fractions $(p_1, p_2, p_3, p_4, p_5) = F(T_{2,C1}, T_{2,C2}, T_{2,C45}, T_{2,C60})$ estimated when solving the linear system in Equation (14) using the four T2 relaxation times, $T_{2,C1}$, $T_{2,C2}$, $T_{2,C45}$, $T_{2,C60}$.

$$M(i\Delta t) = \sum_{j=1}^{60} p_j \exp(-i\Delta t / T_2(j; T_{2,C1}, T_{2,C2}, T_{2,C45}, T_{2,C60})) \quad (14)$$

Algorithm III optimizes the selection of the T2 relaxation times $T_{2,C1}$, $T_{2,C2}$, $T_{2,C45}$, $T_{2,C60}$ by minimizing the error in fitting the proton fraction estimates from optics, $(p_1^{optics}, p_2^{optics}, \ldots, p_5^{optics})$.

$$(T^*_{2,C1}, T^*_{2,C2}, T^*_{2,C45}, T^*_{2,C60}) = \quad (15)$$
$$\min_{T_{2,C1}, T_{2,C2}, T_{2,C45}, T_{2,C60}} \|F(T_{2,C1}, T_{2,C2}, T_{2,C45}, T_{2,C60}) - (p_1^{optics}, p_2^{optics}, p_3^{optics}, p_2^{optics}, p_5^{optics})\|$$

Importantly, the initial guess for this optimization procedure comes from the four parameter scaling law predicted by Algorithm II.

Algorithm III concludes by using the modified scaling law determined from the four T2 relaxation times $(T^*_{2,C1}, T^*_{2,C2}, T^*_{2,C45}, T^*_{2,C60})$ to make a final estimation of the weight fractions as a function of mixture component chain length.

Algorithm III: Estimate Weight Fractions from Calibrated Four Parameter Scaling Law and CPMG and Optics Data
1) Run Algorithm II. Let $(T_{2,C1}^{init}, T_{2,C2}^{init}, T_{2,C45}^{init}, T_{2,C60}^{init})$ be the four parameter scaling law determined by the final iteration.
2) Using standard nonlinear optimization, solve Equation (15) for the adjusted T2 relaxation times $(T_{2,C1}^*, T_{2,C2}^*, T_{2,C45}^*, T_{2,C60}^*)$. Initialize the optimization procedure using $(T_{2,C1}^{init}, T_{2,C2}^{init}, T_{2,C45}^{init}, T_{2,C60}^{init})$.
3) Estimate the mixture component proton fractions by solving Equation (16)

$$M(i\Delta t) = \sum_{j=1}^{60} p_j \exp(-i\Delta t / T_2(j; T^*_{2,C1}, T^*_{2,C2}, T^*_{2,C45}, T^*_{2,C60})) \quad (16)$$

We plotted the Algorithm III processing results for oil 4. The agreement of the weight fraction estimates with GC is much closer than were the Algorithm II processing results. The estimated T2 relaxation times determined from $(T^*_{2,C1}, T^*_{2,C2}, T^*_{2,C45}, T^*_{2,C60})$ have a closer agreement with the T2 relaxation times determined from GC and CPMG measurements.

To assess the overall effectiveness of the Algorithm III estimation procedure, we compared its weight fraction estimation results against GC for all the oils in our database. The average and maximum absolute errors are shown in Tables 2 and 3. Because there were some occasionally significant discrepancies between the optics and GC measurements, we also included in the last column the average and maximum error estimates for Algorithm III when we used the first five weight fraction estimates from GC instead of the five weight fractions from optics. Algorithm III results in this case for were also plotted.

TABLE 2

Average weight fraction estimation errors of Algorithms I, II, and III for CPMG data as compared with GC.

| | Average Error Versus GC | | | |
|---|---|---|---|---|
| oil ID | Algorithm I | Algorithm II | Algorithm III | Algorithm III w/GC |
| 1 | 0.95 | 0.74 | 0.66 | 0.51 |
| 2 | 0.76 | 0.37 | 0.41 | 0.38 |
| 3 | 0.83 | 0.80 | 0.66 | 0.58 |
| 4 | 0.63 | 0.55 | 0.41 | 0.37 |
| 5 | 0.73 | 0.33 | 0.48 | 0.29 |
| 6 | 0.32 | 0.40 | 0.23 | 0.22 |
| 7 | 0.36 | 0.27 | 0.42 | 0.36 |
| 8 | 0.96 | 0.81 | 0.49 | 0.37 |
| 9 | 1.08 | 0.96 | 0.71 | 0.36 |
| 10 | 0.94 | 0.27 | 0.42 | 0.38 |
| 11 | 0.62 | 0.46 | 0.40 | 0.25 |
| 12 | 0.58 | 0.29 | 0.35 | 0.33 |
| 14 | 0.42 | 0.32 | 0.38 | 0.37 |
| 15 | 1.27 | 0.50 | 0.48 | 0.38 |
| 16 | 0.33 | 0.45 | 0.37 | 0.40 |
| 17 | 0.55 | 0.31 | 0.41 | 0.42 |
| 18 | 0.44 | 0.32 | 0.37 | 0.31 |
| 19 | 0.81 | 0.48 | 0.38 | 0.23 |

TABLE 3

Maximum weight fraction estimation errors of Algorithms I, II, and III for CPMG data as compared with GC.

| | Max Error Versus GC | | | |
|---|---|---|---|---|
| oil ID | Algorithm I | Algorithm II | Algorithm III | Algorithm III w/GC |
| 1 | 5.81 | 3.19 | 2.53 | 2.04 |
| 2 | 16.66 | 2.51 | 2.64 | 1.70 |
| 3 | 7.72 | 7.28 | 5.49 | 5.41 |
| 4 | 5.84 | 2.19 | 1.49 | 1.38 |
| 5 | 10.60 | 2.67 | 1.80 | 1.40 |
| 6 | 1.88 | 1.96 | 1.07 | 0.79 |
| 7 | 3.45 | 1.30 | 1.62 | 1.39 |
| 8 | 8.60 | 3.40 | 3.22 | 1.92 |
| 9 | 7.19 | 3.34 | 3.07 | 2.29 |
| 10 | 15.89 | 2.60 | 2.94 | 2.82 |
| 11 | 8.21 | 3.56 | 3.59 | 0.93 |
| 12 | 5.66 | 1.66 | 1.91 | 1.86 |
| 14 | 6.13 | 1.66 | 1.68 | 1.28 |
| 15 | 29.63 | 2.44 | 2.94 | 2.62 |
| 16 | 1.36 | 1.44 | 1.26 | 1.77 |

TABLE 3-continued

Maximum weight fraction estimation errors of Algorithms
I, II, and III for CPMG data as compared with GC.

| | Max Error Versus GC | | | |
|---|---|---|---|---|
| oil ID | Algorithm I | Algorithm II | Algorithm III | Algorithm III w/GC |
| 17 | 9.90 | 1.38 | 1.92 | 1.96 |
| 18 | 4.11 | 1.95 | 1.94 | 1.23 |
| 19 | 15.58 | 3.87 | 3.87 | 1.89 |

Modeling T2 Relaxation Times Estimated from GC and T1T2 Measurements

The methods described herein can be extended and applied to T1T2 relaxation measurements by observing that those measurements can be related to an underlying T2 PDF $f(T_{2,j})$ defined on a grid of T2 relaxation times $T_{2,j}$ via Equation (17).

$$M_t(\text{wt}, i\Delta t) = \sum_j \left(1 - \propto \left(\frac{-wt}{rx_{fixed} * T_{2,j}}\right)\right) \exp(-i\Delta t/T_{2,j}) f(T_{2,j}) \quad (17)$$

Here the T1T2 ratio $rx_{fixed}$ and parameter a can be estimated directly from the T1T2 measurements.

As with the CPMG measurements, we chose to model the T2 relaxation times as a piecewise log-linear function of chain length with nodes at C1, C2, C45, and C60, denoted by $T_2(j; T_{2,C1}, T_{2,C1}, T_{2,C2}, T_{2,C45}, T_{2,C60})$. To establish the four parameter values of this T1T2-based scaling law as functions of temperature, pressure, and mean chain length, we began by estimating the T2 relaxation times $T_{2,C1}, T_{2,C2}, T_{2,C45}, T_{2,C60}$ for each fluid sample from its GC and T1T2 measurements by solving Equation (18)

$$M_t(\text{wt}, i\Delta t) = \sum_j p_j^{GC} \left(1 - \propto \exp\left(\frac{-wt}{rx_{fixed} * T_2(j; T_{2,C1}, T_{2,C2}, T_{2,C45}, T_{2,C60})}\right)\right) \exp(-i\Delta t/T_2(j; T_{2,C1}, T_{2,C2}, T_{2,C45}, T_{2,C60})) \quad (18)$$

As with the CPMG measurements, we placed constraints on the T2 relaxation times at the four nodes $T_{2,C1}, T_{2,C2}, T_{2,C45}, T_{2,C60}$ similar to those specified via Equation (8), namely that the T2 relaxation times be increasing as a function of chain length.

We plotted the $T_{2,C1}, T_{2,C2}, T_{2,C45}, T_{2,C60}$ node values for our piece-wise log linear scaling law that were estimated from the GC and T1T2 measurements by inverting Equations (8) and (18) for each fluid sample. Again, the temperature of the sample was varied at 175° C., 125° C., 75° C. As with the CPMG measurements, we chose to parameterize the log 10 T2 relaxation times as a function of the parameter (mean chain length/temperature)*pressure$^{0.1}$. The R-values of the quadratic functions used to approximate these estimated log 10 T2 relaxation times at the C1, C2, and C45 nodes were all higher than 0.8. Only for the C60 node did we observe a larger scattering of values. As with the CPMG parameter estimation procedure, we did not include samples from oils 1 and 9 as well as various outliers when determining the scaling law.

Equation (19) constitutes our four parameter piecewise log-linear scaling law as functions of temperature, pressure, and arithmetic mean chain length for modeling T2 relaxation times derived from T1T2 and GC measurements.

$X$=(Mean Chain Length/Temperature)*Pressure$^{0.1}$ $T_{2,C1}(X) = \exp(-646.7X^2 + 48.07X + 1.39)$ $T_{2,C2}(X) = \exp(-526.21X^2 + 35.35X + 1.46)$ $T_{2,C45}(X,T) = \exp(-1088.6X^2 + 122.42X - 6.80 + T/160)$ $T_{2,C60}(X,T) = \exp(-699.5X^2 + 94.30X - 9.2434 + T/160) \quad (19)$ As we did with the CPMG measurements, we can validate the scaling law given in Equation (19) by assessing how well it predicts the T1T2 data from the GC measurements using Equation (18). That is, using the GC measurements we can (a) compute the sample proton fractions $p_j^{GC}$ a function of chain length j; (b) compute the arithmetic mean chain length M from the sample proton fractions $p_j^{GC}$; (c) use the sample temperature, pressure, and mean chain length to compute the node values $T_{2,C1}, T_{2,C2}, T_{2,C45}, T_{2,C60}$ for the four parameter scaling law described in Equation (17); and finally, (d) use Equation (18) to forward model the T1T2 measurements. Overall, we observed good qualitative agreement for the majority of the samples.

Estimating Weight Fractions from T1T2 data using the Four Parameter Scaling Law

We found that a variation of Algorithm II for optics and T1T2 measurements produced the best weight fraction estimation results. Adjusting the T2 relaxation times using the optics using a variation of Algorithm III was not required.

Algorithm II for T1T2 Data: Use Scaling Law, T1T2 and Optics Data to Estimate Weight Fractions 1) Initial Guess for Mean Chain Length, $M_{current} = 20$.
2) Use the sample temperature, pressure, and $M_{current}$ in Equation (19) to compute T2 relaxation times at the four nodes $T_{2,C1}, T_{2,C2}, T_{2,C45}$, and $T_{2,C60}$.
3) Estimate component proton fractions by solving linear system given by $$M_t(\text{wt}, i\Delta t) = \sum_{j=1}^{60} p_j \left(1 - \propto \exp\left(\frac{-wt}{rx_{fixed} * T_2(j; T_{2,C1}, T_{2,C2}, T_{2,C45}, T_{2,C60})}\right)\right) \exp(-i\Delta t/T_2(j; T_{2,C1}, T_{2,C2}, T_{2,C45}, T_{2,C60})) \quad (20)$$

Here $T_2(j; T_{2,C1}, T_{2,C2}, T_{2,C45}, T_{2,C60})$ is value of the log linear interpolation between the T2 relaxation times for C1, C2, C45 and C60.

4) Replace the first five estimated values for proton fractions $p_1$ with the corresponding estimates for proton fractions obtained from optics. Renormalize the proton fractions $p_j$ for j=6, ... 60 so that the sum of all proton fractions is 100%. Update current mean chain length estimate, $M_{current}$ using the modified set of proton fractions.
5) Repeat steps (2)-(5) until mean chain length estimate converges.

To assess the overall effectiveness of the Algorithm II estimation procedure for T1T2 data, we compared its weight fraction estimation results against GC for all the oils in our database. The average and maximum absolute errors are shown in Tables 4 and 5. Because there were some occasionally significant discrepancies between the optics and GC measurements, we also included in the last column the average and maximum error estimates for Algorithm II when we used the first five weight fraction estimates from GC instead of the five weight fractions from optics. Algorithm II results in this case for individual oils were also plotted.

TABLE 4

Average weight fraction estimation errors of Algorithms I and II for T1T2 data as compared with GC.

| oil ID | Average Error Vs GC | | |
|---|---|---|---|
|  | Algorithm I | Algorithm II | Algorithm II (GC As Optics) |
| 1 | 0.55 | 0.61 | 0.60 |
| 2 | 0.94 | 0.31 | 0.27 |
| 3 | 0.95 | 0.79 | 0.49 |
| 4 | 1.18 | 0.79 | 0.67 |
| 5 | 0.60 | 0.50 | 0.33 |
| 6 | 0.23 | 0.22 | 0.20 |
| 7 | 0.31 | 0.43 | 0.32 |
| 8 | 0.94 | 1.02 | 0.80 |
| 9 | 1.25 | 0.93 | 0.76 |
| 10 | 0.64 | 0.29 | 0.26 |
| 11 | 0.48 | 0.47 | 0.16 |
| 12 | 0.57 | 0.37 | 0.23 |
| 14 | 0.67 | 0.52 | 0.43 |
| 15 | 0.75 | 0.39 | 0.40 |
| 16 | 0.34 | 0.36 | 0.32 |
| 17 | 0.43 | 0.39 | 0.35 |
| 18 | 0.46 | 0.28 | 0.26 |
| 19 | 0.58 | 0.34 | 0.34 |

TABLE 5

Maximum weight fraction estimation errors of Algorithms I and II for T1T2 data as compared with GC.

| oil ID | Max Error versus GC | | |
|---|---|---|---|
|  | Algorithm I | Algorithm II | Algorithm II (GC As Optics) |
| 1 | 2.36 | 2.37 | 2.34 |
| 2 | 4.08 | 1.63 | 1.66 |
| 3 | 5.80 | 3.25 | 2.77 |
| 4 | 4.88 | 4.26 | 3.70 |
| 5 | 2.65 | 2.45 | 1.60 |
| 6 | 0.79 | 1.19 | 0.53 |
| 7 | 4.89 | 2.98 | 2.13 |
| 8 | 13.35 | 8.05 | 7.28 |
| 9 | 4.86 | 2.83 | 2.96 |
| 10 | 5.53 | 2.72 | 2.23 |
| 11 | 7.48 | 5.42 | 1.02 |
| 12 | 2.62 | 2.06 | 1.78 |
| 14 | 3.44 | 2.69 | 2.49 |
| 15 | 4.37 | 1.03 | 0.98 |
| 16 | 1.49 | 1.19 | 1.04 |
| 17 | 1.89 | 1.63 | 1.68 |
| 18 | 3.58 | 1.93 | 1.54 |
| 19 | 7.11 | 3.86 | 1.66 |

In another embodiment, the NMR data can be used to improve fluid composition determinations made from the optics data. In particular, if there is a small amount of water (under about 5%), and the water and hydrocarbon volumes can be determined from the NMR data, then these values can be used to constrain the estimation of fluid composition from the optics data. In one method, different models for two-phase flow can be applied to the optics data, and the ones that give the accurate water and hydrocarbon fractions can then be used in determining the hydrocarbon composition from the optics data. The volume fraction of water can also be used to constrain the optics data to determine the amount of carbon dioxide in the sample. This information can then be used to improve the determination of the composition of the oil or gas in the sample from the NMR data.

According to one aspect, the previously-described methods can be used to analyze the composition of a hydrocarbon-containing fluid not only downhole, but in a laboratory or uphole at a wellsite. In one embodiment, a hydrocarbon-containing fluid is subject to an NMR relaxation or diffusion experiment in order to obtain NMR relaxation or diffusion data as well as to a non-NMR experiment such as an optical experiment to obtain non-NMR data such as optical data. The data obtained by the non-NMR experiment is then used to modify the analysis of the NMR data in determining indications of the composition. In another embodiment, optical data may be used to constrain an inversion of the NMR data.

According to a further aspect, the previously-described methods can be used in conjunction with single-phase samples (e.g., liquid), and multi-phase samples (e.g., liquid and gas) including emulsions. The previously-described methods can also be used in conjunction with samples containing water.

Figure 3:
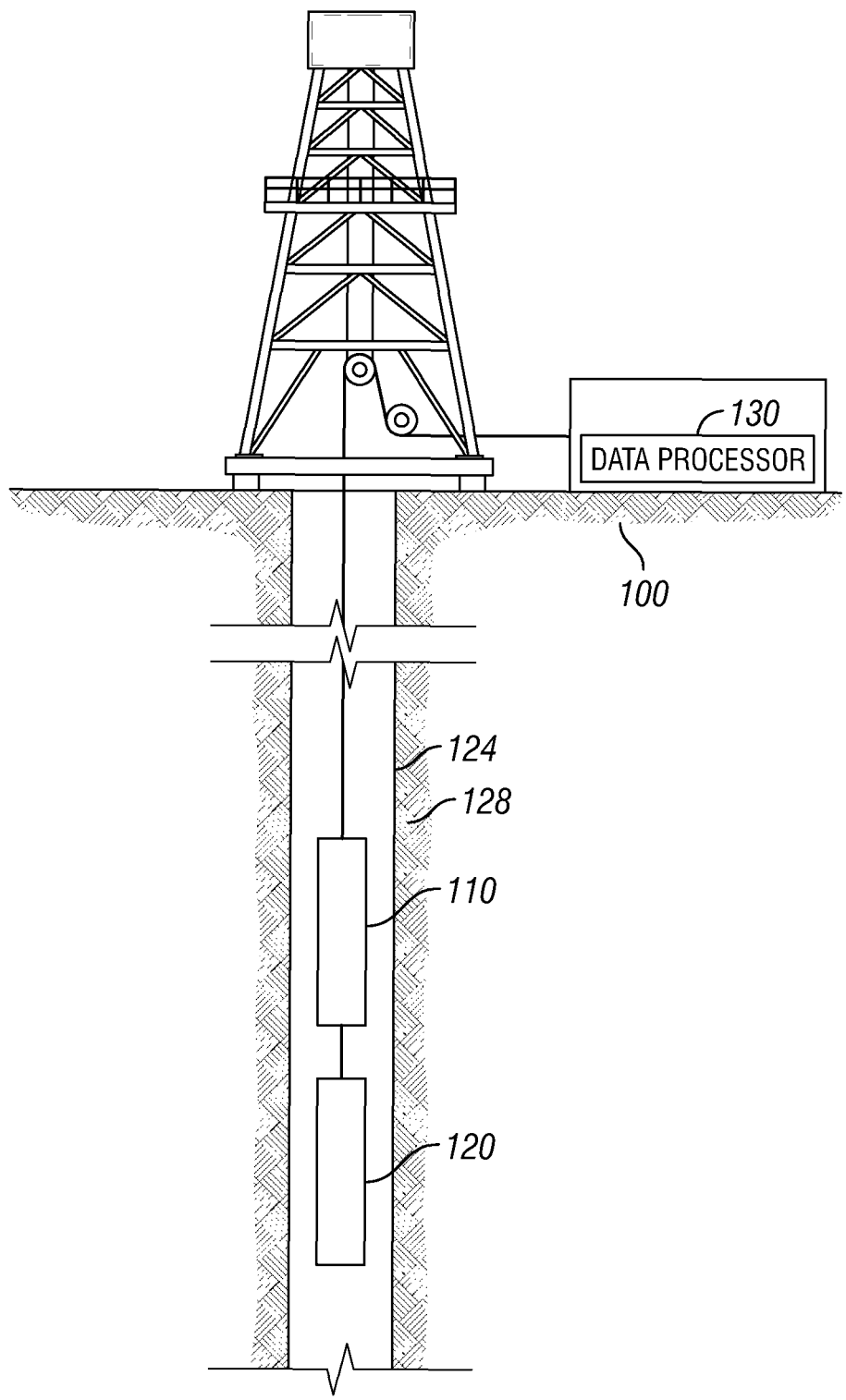
FIG. 3 is an apparatus for implementing disclosed methods.

According to another aspect, as seen in FIG. 3, an apparatus 100 is provided for implementing the previously-described methods. The apparatus 100 includes a tool string including an NMR borehole tool 110 and a non-NMR borehole tool 120, shown located in a borehole 124 of a formation 128, and a processor 130 that is coupled to tools 110 and 120. The NMR borehole tool 110 may be any commercially available NMR tool or any proposed tool capable of conducted NMR measurements downhole. In one embodiment, the NMR borehole tool 110 is capable of conducting NMR relaxation and/or diffusion measurements on a hydrocarbon-containing fluid sample. The non-NMR tool 120 may be any commercially available non-NMR tool or any proposed tool of conducted non-NMR measurements downhole that are useful in modifying an NMR data analysis, e.g., by being useful in constraining an inversion of the NMR data. In one embodiment, the non-NMR tool 120 is a formation tester instrument such as the CFA™ tool that is capable of optically scanning the hydrocarbon-containing fluid sample that is located in a flowline of the tool. The processor 130, although shown on the surface of formation 128, may be part of either or both of tools 110 and 120 or may be a separate processor that may be located downhole or uphole. The processor may be a programmed computer, a dedicated processor, a microprocessor, a system of microprocessors, a digital signal processor (DSP), an application-specific integrated circuit (ASIC), or other circuitry capable of analyzing the NMR data obtained by tool 110 in light of the data obtained by tool 120.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method of analyzing a composition of a hydrocarbon phase of a hydrocarbon-containing fluid containing a plurality of hydrocarbons of different chain lengths, comprising:
   using a nuclear magnetic resonance (NMR) tool to conduct a NMR relaxation measurement, a diffusion measurement, or both on the hydrocarbon-containing fluid to obtain NMR data;
   using a non-NMR tool to conduct an additional measurement of a reference fluid containing hydrocarbons to obtain non-NMR data wherein the additional measurement comprises gas chromatography, optical spectroscopy, or both; and
   using the NMR data and the non-NMR data in an inversion process to determine an indication of the composition of the hydrocarbon phase of the hydrocarbon-containing fluid.

2. The method of claim 1, wherein the indication is determined over a plurality of chain length nodes.

3. The method of claim 2, wherein the plurality of nodes comprises 4 nodes.

4. The method of claim 2, wherein the nodes are C1, C2, C45, and C60.

5. The method of claim 2, wherein the using the NMR data and the non-NMR data in an inversion process includes (i) assuming an estimated mean chain length $M_{current}$ for the hydrocarbon phase of a hydrocarbon-containing fluid, (ii) using the temperature and pressure of the hydrocarbon-containing fluid together with the $M_{current}$ to compute $T_2$ relaxation times at the plurality of chain length nodes, (iii) estimating component proton fractions $P_j$ by solving a linear system, (iv) replacing proton fraction estimates of a plurality of the smallest chain values with corresponding estimates obtained from the additional measurement and renormalizing the component proton fractions other than the replaced proton fraction estimates so that the sum of all proton fractions is 100%; (v) updating the mean chain length estimate using the modified set of proton fractions, and (vi) repeating (ii) - (vi) until the mean chain length estimate converges.

6. The method of claim 5, wherein the using the NMR data and the non-NMR data in an inversion process further includes (vii) optimizing the selection of $T_2$ relaxation times at the plurality of nodes by minimizing error in fitting the proton fraction estimates from the additional measurement to obtain adjusted $T_2$ relaxation times, and (viii) estimating mixture component proton fractions utilizing the adjusted $T_2$ relaxation times.

7. The method of claim 5, wherein, the replacing proton fraction estimates of a plurality of the smallest chain values comprises replacing the first five estimate values for proton fractions $p_j$, and the renormalizing is for $p_j$ for $j = 6, \ldots 60$.

8. The method of claim 7, wherein the plurality of chain length nodes comprises four nodes.

9. The method of claim 8, wherein the four nodes are C1, C2, C45, and C60.

10. The method of claim 9, wherein the linear system is given by $$M(i\Delta t) = \sum_{j=1}^{60} p_j \exp\left(\frac{-i\Delta t}{T_2(j; T_{2,C1}, T_{2,C2}, T_{2,C45}, T_{2,C60})}\right)$$

where $T_2(j; T_{2,C1}, T_{2,C2}, T_{2,C45}, T_{2,C60})$ is the value of the log linear interpolation between the $T_2$ relaxation times for hydrocarbons of chain length C1, C2, C45 and C60, and $M(i\Delta t)$ is the NMR data obtained by the NMR tool.

11. The method of claim 10, wherein the additional measurement is an optical spectroscopy measurement, and the using the NMR data and the non-NMR data in an inversion process further includes using nonlinear optimization to solve $$(T^*_{2,C1}, T^*_{2,C2}, T^*_{2,C45}, T^*_{2,C60}) = \min_{T_{2,C1}, T_{2,C2}, T_{2,C45}, T_{2,C60}} \|F(T_{2,C1}, T_{2,C2}, T_{2,C45}, T_{2,C60}) - (p_1^{optics}, p_2^{optics}, p_3^{optics}, p_2^{optics}, p_5^{optics})\|$$

where $(T^*_{2,C1}, T^*_{2,C2}, T^*_{2,C45}, T^*_{2,C60})$ are the adjusted relaxation times, $(T_{2,C1}, T_{2,C2}, T_{2,C45}, T_{2,C60})$ are relaxation times obtained from the repeating (ii) —(vi) until the mean chain length estimate converges and are used as initial values in the nonlinear optimization, and $P_1^{optics}$, $P_2^{optics}$, $P_3^{optics}$, $P_2^{optics}$ are the proton fraction estimates from the optical spectroscopy measurement.

12. The method of claim 11, wherein the estimating mixture component proton fractions utilizing the adjusted $T_2$ relaxation times comprises estimating according to $$M(i\Delta t) = \sum_{j=1}^{60} p_j \exp\left(\frac{-i\Delta t}{T_2(j; T^*_{2,C1}, T^*_{2,C2}, T^*_{2,C45}, T^*_{2,C60})}\right).$$

13. The method of claim 9, wherein the linear system is given by $M(wt, i\Delta t) =$ $$\sum_{j=1}^{60} p_j \left(1 - \alpha \exp\left(\frac{-wt}{rx_{fixed} * T_2(j; T_{2,C1}, T_{2,C2}, T_{2,C45}, T_{2,C60})}\right)\right)$$

$$\exp\left(\frac{-i\Delta t}{T_2(j; T_{2,C1}, T_{2,C2}, T_{2,C45}, T_{2,C60})}\right)$$

where $T_2(j; T_{2,C1}, T_{2,C2}, T_{2,C45}, T_{2,C60})$ is the value of the log linear interpolation between the $T_2$ relaxation times for hydrocarbons of chain length C1, C2, C45 and C60, $rx_{fixed}$ is the $T_1T_2$ ratio obtained from the NMR relaxation measurement, $\alpha$ is a parameter estimated from $T_1T_2$ measurements, $M(wt, i\Delta t)$ is the NMR data obtained by the NMR tool data for different wait times wt of the $T_1T_2$ measurements.

14. The method of claim 1, wherein the reference fluid is the hydrocarbon-containing fluid.

15. The method of claim 1, wherein the reference fluid is not the hydrocarbon-containing fluid.

16. The method of claim 1, wherein the additional measurement is conducted at a pressure of 5000 to 25000 psi.

17. The method of claim 1, wherein the additional measurement is conducted at a temperature of 75 to 175 ° C.

18. The method of claim 1, wherein the inversion process comprises inverting the NMR data and using the non-NMR data to constrain the inversion of the NMR data.

19. The method of claim 1, wherein the inversion results in NMR distributions consistent with the non-NMR data.

20. The method of claim 1, wherein the inversion process comprises combining the NMR data and the non-NMR data and inverting the combined NMR data and non-NMR data to obtain the indication of the composition of the hydrocarbon-containing fluid.

21. The method of claim 1, wherein the non-NMR tool is an optical tool, the additional measurements are optical measurements, and the non-NMR data are optical data.

22. The method of claim 21, wherein the inversion process comprises inverting the optical data and using the NMR data to constrain the inversion of the optical data.

23. The method of claim 1, wherein the non-NMR tool is a gas chromatography tool, the additional measurements are gas chromatography measurements, and the non-NMR data are gas chromatography data.

24. The method of claim 23, wherein the inversion process comprises inverting the gas chromatography data and using the NMR data to constrain the inversion of the gas chromatography data.

25. A method of analyzing a composition of a hydrocarbon phase of a hydrocarbon-containing fluid containing a plurality of hydrocarbons of different chain lengths in a subterranean formation traversed by a wellbore, comprising:
positioning a nuclear magnetic resonance (NMR) tool in the formation;
extracting the hydrocarbon-containing formation fluid from the formation;
using the NMR tool to conduct a NMR relaxation measurement, a diffusion measurement, or both on the extracted formation fluid to obtain NMR data;
using a non-NMR tool to conduct an additional measurement of a reference fluid containing hydrocarbons to obtain non-NMR data wherein the additional measurement comprises gas chromatography, optical spectroscopy, or both; and
using the NMR data and the non-NMR data in an inversion process to determine an indication of the composition of the hydrocarbon phase of the extracted formation fluid.

26. The method of claim 25, wherein the inversion process comprises inverting the NMR data and using the non-NMR data to constrain the inversion of the NMR data.

27. The method of claim 25, wherein the inversion results in NMR distributions consistent with the non-NMR data.

28. The method of claim 25, wherein the inversion process comprises combining the NMR data and the non-NMR data and inverting the combined NMR data and non-NMR data to obtain the indication of the composition of the hydrocarbon-containing fluid.

29. The method according to claim 25, wherein the inversion process comprises combining the NMR data and the non-NMR data and inverting the combined NMR data and non-NMR data to obtain the indication of the composition of the extracted formation fluid.

30. The method of claim 25, wherein the indication is determined over a plurality of chain length nodes, and wherein the using the NMR data and the non-NMR data in an inversion process includes (i) assuming an estimated mean chain length $M_{current}$ for the hydrocarbon phase of a hydrocarbon-containing fluid, (ii) using the temperature and pressure of the hydrocarbon-containing fluid together with the $M_{current}$ to compute $T_2$ relaxation times at the plurality of chain length nodes, (iii) estimating component proton fractions $p_j$ by solving a linear system, (iv) replacing proton fraction estimates of a plurality of the smallest chain values with corresponding estimates obtained from the additional measurement and renormalizing the component proton fractions other than the replaced proton fraction estimates so that the sum of all proton fractions is 100%; (v) updating the mean chain length estimate using the modified set of proton fractions, and (vi) repeating (ii) - (vi) until the mean chain length estimate converges.

31. The method of claim 30, wherein, the replacing proton fraction estimates of a plurality of the smallest chain values comprises replacing the first five estimate values for proton fractions $p_j$, and the renormalizing is for $p_j$ for j =6, . . . 60.

32. The method of claim 31, wherein the plurality of chain length nodes comprises four nodes.

33. The method of claim 32, wherein the four nodes are C1, C2, C45, and C60.

34. The method of claim 33, wherein the linear system is given by $$M(i\Delta t) = \sum_{j=1}^{60} p_j \exp\left(\frac{-i\Delta t}{T_2(j; T_{2,C1}, T_{2,C2}, T_{2,C45}, T_{2,C60})}\right)$$

where $T_2(j; T_{2,C1}, T_{2,C2}, T_{2,C45}, T_{2,C60})$ is the value of the log linear interpolation between the $T_2$ relaxation times for hydrocarbons of chain length C1, C2, C45 and C60, and $M(i\Delta t)$ is the NMR data obtained by the NMR tool.

35. The method of claim 34, wherein the additional measurement is an optical spectroscopy measurement, and the using the NMR data and the non-NMR data in an inversion process further includes using nonlinear optimization to solve $$(T^*_{2,C1}, T^*_{2,C2}, T^*_{2,C45}, T^*_{2,C60}) =$$
$$\min_{T_{2,C1}, T_{2,C2}, T_{2,C45}, T_{2,C60}} \|F(T_{2,C1}, T_{2,C2}, T_{2,C45}, T_{2,C60}) -$$
$$(p_1^{optics}, p_2^{optics}, p_3^{optics}, p_2^{optics}, p_5^{optics})\|$$

where($T^*_{2,C1}$, $T^*_{2,C2}$, $T^*_{2,C45}$, $T^*_{2,C60}$) are the adjusted relaxation times, ($T_{2,C1}$, $T_{2,C2}$, $T_{2,C45}$, $T_{2,C60}$) are relaxation times obtained from the repeating (ii) —(vi) until the mean chain length estimate converges and are used as initial values in the nonlinear optimization, and $p_1^{optics}$, $P_2^{optics}$, $p_3^{optics}$, $P_2^{optics}$, $P_5^{optics}$ are the proton fraction estimates from the optical spectroscopy measurement.

36. The method of claim 35, wherein the estimating mixture component proton fractions utilizing the adjusted $T_2$ relaxation times comprises estimating according to $$M(i\Delta t) = \sum_{j=1}^{60} p_j \exp\left(\frac{-i\Delta t}{T_2(j; T^*_{2,C1}, T^*_{2,C2}, T^*_{2,C45}, T^*_{2,C60})}\right).$$

optimizing the selection of $T_2$ relaxation times at the plurality of nodes by minimizing error in fitting the proton fraction estimates from the additional measurement to obtain adjusted $T_2$ relaxation times, and (viii) estimating mixture component proton fractions utilizing the adjusted $T_2$ relaxation times.

37. The method of claim 33, wherein the linear system is given by M(wt, iΔt) =

$$\sum_{j=1}^{60} p_j \left(1 - \alpha \exp\left(\frac{-wt}{rx_{fixed} * T_2(j; T_{2,C1}, T_{2,C2}, T_{2,C45}, T_{2,C60})}\right)\right)$$

$$\exp\left(\frac{-i\Delta t}{T_2(j; T_{2,C1}, T_{2,C2}, T_{2,C45}, T_{2,C60})}\right)$$

where $T_2(j; T_{2,C1}, T_{2,C2}, T_{2,C45}, T_{2,C60})$ is the value of the log linear interpolation between the $T_2$ relaxation times for hydrocarbons of chain length C1, C2, C45 and C60, $rx_{fixed}$ is the $T_1T_2$ ratio obtained from the NMR relaxation measurement, $\alpha$ a is a parameter estimated from $T_1T_2$ measurements, M(wt, iΔt) is the NMR data obtained by the NMR tool data for different wait times wt of the $T_1T_2$ measurements.

38. The method of claim 30, wherein the using the NMR data and the non-NMR data in an inversion process further includes (vii) optimizing the selection of $T_2$ relaxation times at the plurality of nodes by minimizing error in fitting the proton fraction estimates from the additional measurement to obtain adjusted $T_2$ relaxation times, and (viii) estimating mixture component proton fractions utilizing the adjusted $T_2$ relaxation times.

* * * * *